T. D. WISHART.
INTERNAL COMBUSTION ENGINE.
APPLICATION FILED SEPT. 11, 1920.
1,424,226.
Patented Aug. 1, 1922.
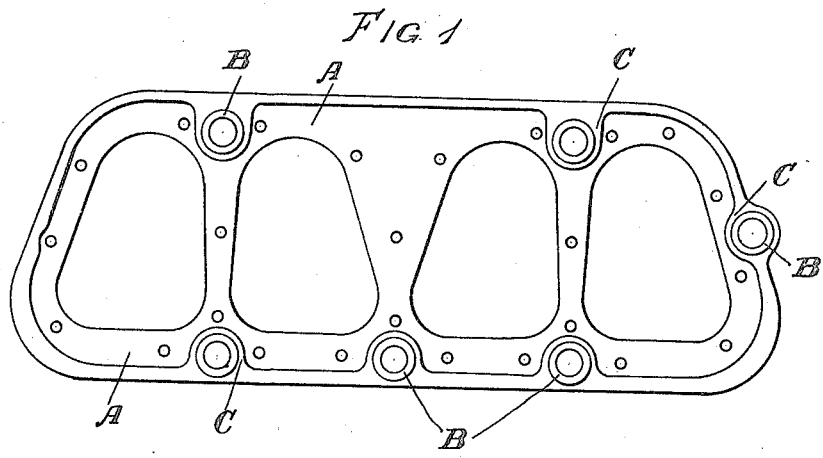
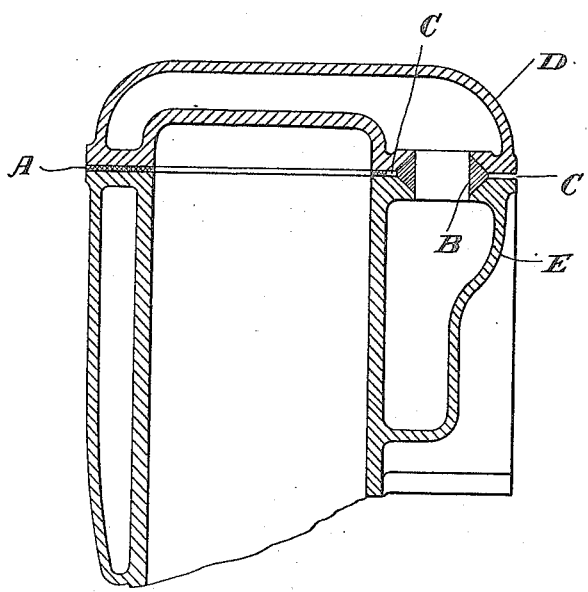
INVENTOR:
Thomas Dick Wishart
By Wm Wallace White
ATT'Y.

UNITED STATES PATENT OFFICE.

THOMAS DICK WISHART, OF HEATON CHAPEL, NEAR STOCKPORT, ENGLAND, ASSIGNOR OF ONE-HALF TO CROSSLEY MOTORS LIMITED, OF GORTON, MANCHESTER, ENGLAND.

INTERNAL-COMBUSTION ENGINE.

1,424,226.     Specification of Letters Patent.     Patented Aug. 1, 1922.

Application filed September 11, 1920. Serial No. 409,541.

*To all whom it may concern:*

Be it known that I, THOMAS DICK WISHART, a subject of the King of Great Britain, and residing at 7 Victoria Grove, Heaton Chapel, near Stockport, in the county of Lancaster, England, have invented certain new and useful Improvements in Internal-Combustion Engines, of which the following is a specification.

My invention relates to internal combustion engines and particularly to improvements in the construction of cylinders having detachable heads.

A common defect in such cylinders as at present constructed with water passages in the usual copper and asbestos joint between the head and the body of the cylinder is that water leaks from the water jacket into the cylinder and ultimately finds its way into the crankcase. The object of my invention is to obviate and overcome this defect and I attain my object by the improved construction illustrated in the accompanying sheet of drawings in which—

Fig. 1 is a plan of the cylinder with the detachable head removed to show the improved joint and Fig. 2 is an enlarged section through one of the cylinder barrels, and the water connection for the jacket.

In my invention as illustrated in these views I employ the usual method of fixing the detachable head D to the cylinders E by means of studs or bolts (not shown). I make the joint between these two parts by means of the usual type of copper and asbestos joint A, but having no water passages through this joint as in the usual construction. The water passages between the cylinder and the head are combined in each casting, but are connected together by an entirely separate and independent joint B from the copper and asbestos joint A.

There is a clear air space C between the copper and asbestos joint A and the water connection joint B, thus allowing any water which may leak from the water joint to flow outside the cylinders and not into either the barrel of the cylinder or the valve chambers.

What I claim as my invention and desire to secure by Letters Patent of the United States is:—

In an internal combustion engine, a cylinder, a detachable head secured to said cylinder, a gasket between said cylinder and head, said cylinder and head castings having openings for the passage of water between the cylinder and head, internally coned seats for a jointing member at said openings, a washer having conical projecting surfaces adapted to fit between said seats to seal the water passage independently of said gasket, and an annular passage to the air for the escape of leakage from the water joint.

In witness whereof I have hereunto signed my name.

THOMAS DICK WISHART.